United States Patent
Kerth et al.

(10) Patent No.: US 7,609,781 B2
(45) Date of Patent: Oct. 27, 2009

(54) WIRELESS COMMUNICATION DEVICE WITH SELF CALIBRATION FEATURE FOR CONTROLLING POWER OUTPUT

(75) Inventors: Donald A. Kerth, Austin, TX (US); Srinath Sridharan, Austin, TX (US)

(73) Assignee: ST-Ericsson SA, Geneva (CH)

( * ) Notice: Subject to any disclaimer, the term of this patent is extended or adjusted under 35 U.S.C. 154(b) by 657 days.

(21) Appl. No.: 11/427,800

(22) Filed: Jun. 30, 2006

(65) Prior Publication Data

US 2008/0002786 A1    Jan. 3, 2008

(51) Int. Cl.
*H04B 1/04*    (2006.01)
*H04B 17/00*    (2006.01)

(52) U.S. Cl. .................... 375/297; 375/224; 455/115.1; 455/127.3

(58) Field of Classification Search ................. 375/224, 375/296, 297; 455/115.1, 127.1–127.3
See application file for complete search history.

(56) References Cited

U.S. PATENT DOCUMENTS

| | | | |
|---|---|---|---|
| 5,748,037 A * | 5/1998 | Rozental et al. ................ 330/2 |
| 5,983,085 A | 11/1999 | Zamat |
| 6,374,116 B1 | 4/2002 | Peterzell |
| 6,819,938 B2 | 11/2004 | Sahota |
| 6,876,697 B2 * | 4/2005 | Peters et al. ................ 375/222 |
| 7,215,972 B2 * | 5/2007 | Premakanthan et al. ..... 455/522 |
| 7,450,916 B1 * | 11/2008 | Hietala et al. ............ 455/127.2 |
| 2005/0032487 A1 | 2/2005 | Montalvo |
| 2005/0043053 A1 | 2/2005 | Lin |
| 2006/0132230 A1 | 6/2006 | Douglas |

FOREIGN PATENT DOCUMENTS

EP    1484839 A1    12/2004

OTHER PUBLICATIONS

Agilent—"Using Error Vector Magnitude Measurements to Analyze and Troubleshoot Vector-Modulated Signals", Agilent PN 89400-14 (© 1997).
Elson—"Time Synchronization for Wireless Sensor Networks", IPDPS 2001—WNC Workshop (Apr. 27, 2001).
Ericsson—"EDGE-13 Intro of High-Speed Data in GSM/GPRS Networks" (© 2003).
Mannion—"Single-chip Edge Transceiver Rolls", CommsDesign (Nov. 7, 2005).
Maxim—"Maxim Wireless/RF Power Amplifier Selector Guide", Dallas Semiconductor Maxim Application Note 335 (Nov. 1, 2000).
Morgan1—"GSM/EDGE Handset Radio Tutorial" (© 2005).
Morgan2—"Highly Integrated Transceiver Enables High-Volume Production of GSM/EDGE Handsets" (© 2005).
Silicon Labs—Silicon Laboratories Introduces Industry's Easiest-To-Use Highest Performance Single Chip EDGE Transceiver (Sep. 26, 2005).

* cited by examiner

*Primary Examiner*—David B Lugo
(74) *Attorney, Agent, or Firm*—William J. Kubida; Hogan & Hartson LLP (57) ABSTRACT

A wireless communication device is disclosed which employs a minimal number of power calibrations to set the output power of the device to a specified output power level. In one embodiment, the disclosed communication device includes a self calibrating feature that sets the output power level during initialization of the device.

29 Claims, 4 Drawing Sheets

FACTORY CALIBARATION

FIG. 5

NORMAL USE

WIRELESS COMMUNICATION DEVICE WITH SELF CALIBRATION FEATURE FOR CONTROLLING POWER OUTPUT

TECHNICAL FIELD OF THE INVENTION

The disclosures herein relate generally to wireless communication systems, and more particularly, to controlling the output power of radio frequency signals that wireless communication systems generate.

BACKGROUND

Modern wireless communication devices typically include a baseband section, an RF transmitter section and an RF receiver section. In broad terms, when the wireless device operates in transmit mode, the baseband section processes signals before they are modulated and up-converted for transmission by the RF transmitter section at a higher frequency than employed in the baseband section. When the wireless device operates in receive mode, the baseband section processes signals after they have been down-converted by the RF receiver section. The transmitter section and receiver section together form an RF transceiver section. The baseband section and the RF transceiver section may be fabricated on separate integrated circuits (IC's) that are interfaced with one another. The RF transceiver section includes a frequency synthesizer that controls the transmit and receive frequencies of the communication device.

Many contemporary communication devices transmit information in a series of signal bursts. For example, time division multiple access (TDMA) communications systems employ a series of TDMA bursts to transmit information. If a communication transmitter were allowed to immediately power up to full power at the beginning of a burst and to immediately power down at the end of a burst, such a transmitter could generate undesired radio frequency products in the radio spectrum. These undesired products could potentially interfere with the operation of other communication devices. It is thus desirable to ramp up and ramp down the power of the transmitter at the beginning and end of a burst in a controlled manner to avoid generating undesired radio frequency products.

Industry standards and/or government regulations may place strict limits on the amount of power that a transmitter may transmit, for example during a signal burst. In some transmitters, setting the output power to a prescribed power limit may take multiple steps. The more time that such output power calibration consumes, the more expensive a particular communication device becomes to manufacture in the communication device factory. It is desirable that communication devices be manufactured by a process which includes output power calibration that employs a minimal a number of steps.

What is needed is a wireless communication device including an improved output calibration feature which addresses the problems discussed above.

SUMMARY

Accordingly, in one embodiment, a method is disclosed for calibrating the gain of a transmitter. The method includes providing a ramp signal to a transmitter including first and second stages. The ramp signal exhibits a predetermined value among a range of values. The method also includes adjusting, by the first stage, a reference signal to exhibit a reference signal value that is approximately equal to the ramp signal predetermined value. The reference signal value and the ramp signal value control the gain of the first stage. The method still further includes adjusting, by the second stage, power generated by the transmitter to a predetermined power level. In one embodiment, the predetermined value of the ramp signal is a maximum value among the range of values for the ramp signal.

In another embodiment, a method is disclosed for calibrating a wireless communication device that includes a baseband section coupled to a transmitter section, and a radio frequency (RF) amplifier section coupled to the transmitter section. The transmitter section includes a variable attenuator stage coupled to a variable gain mixer. The method includes powering on the communication device to initialize the communication device. The method also includes switchably supplying, by the baseband section, a ramp signal to the transmitter section, the ramp signal being set to a maximum voltage value among a range of voltage values. The ramp signal is initially decoupled from the variable attenuator stage. The method further includes varying, by a reference voltage circuit in the transmitter section, a reference voltage applied to the variable attenuator stage to be approximately equal to the maximum voltage value of the ramp signal. The method also includes varying the gain of the variable gain mixer stage until the RF amplifier exhibits an output power approximately equal to a specified power output value. In one embodiment, the step of varying the gain of the variable gain mixer stage includes varying a digital voltage gain amplifier (DVGA) word that controls the gain of the variable gain mixer stage to determine a particular DVGA word that sets the gain of the variable gain mixer stage at a level that causes the RF amplifier to exhibit an output power approximately equal to a specified power output value. The method also includes storing, in a memory, the particular DVGA word for later use in operating the wireless communication device. In one embodiment, the method further includes retrieving, from the memory, the particular DVGA word for use in subsequent operation of the wireless device to set the power output of the communication device to the specified power output value.

In yet another embodiment, a wireless communication device is disclosed that includes a baseband section. The device also includes a transmitter section, coupled to the baseband section, the transmitter section including a first stage coupled to a second stage. The baseband section supplies a ramp signal to the first stage. The ramp signal exhibits a predetermined value among a range of values. The first stage includes a reference signal generator that generates a reference signal that is adjusted to exhibit a reference signal value that is approximately equal to the ramp signal predetermined value. The reference signal value and the ramp signal value control the gain of the first stage. The second stage exhibits an adjustable gain wherein the second stage determines a second stage gain value for which the device generates output power equal to a predetermined power level.

In another embodiment, a wireless communication device is disclosed that includes a baseband section. The communication device also includes a transmitter section, coupled to the baseband section, wherein the transmitter section includes a variable attenuator stage coupled to a variable gain mixer stage. The communication device further includes an RF amplifier coupled to the transmitter section to provide a RF power output signal. The baseband section switchably supplies to the variable attenuator stage a ramp signal that exhibits a maximum voltage value among a range of voltage values, the ramp signal initially being decoupled from the variable attenuator stage. The transmitter section includes a reference voltage circuit that varies a reference voltage applied to the variable attenuator stage to be approximately equal to the maximum voltage value of the ramp signal. The transmitter section further includes control circuitry that varies the gain of the variable gain mixer stage until the RF amplifier exhibits an output power approximately equal to a specified power output value. In one embodiment, the transmitter section varies the gain of the variable gain mixer stage by changing the value of a digital voltage gain amplifier (DVGA) word to determine a particular DVGA word that when applied to the variable gain mixer stage adjusts the gain of the variable gain mixer stage such that the RF amplifier exhibits an output power approximately equal to a specified power output value. The communication device includes a memory that stores the particular DVGA word that corresponds to the RF amplifier exhibiting an output power approximately equal to the specified power output value. The particular DVGA word is used in subsequent operation of the wireless device to set the power output of the communication device to the specified power output value.

BRIEF DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION

In the manufacture of wireless communications devices, it is desirable to limit the number of calibrations performed in the factory to build the communication device. For example, in global system for communication (GSM) devices that employ enhanced data for global evolution (EDGE) technology, it is desirable that the number of calibrations needed to set the device's output power to a strictly controlled output power value be as few as possible. When the communication device is transmitting, a very tight specification applies to the maximum output power. Since the maximum output power of the communication device involves such a stringent specification, the communication device is typically calibrated to compensate for tolerances within the communication device and its RF power amplifier.

Figure 1:
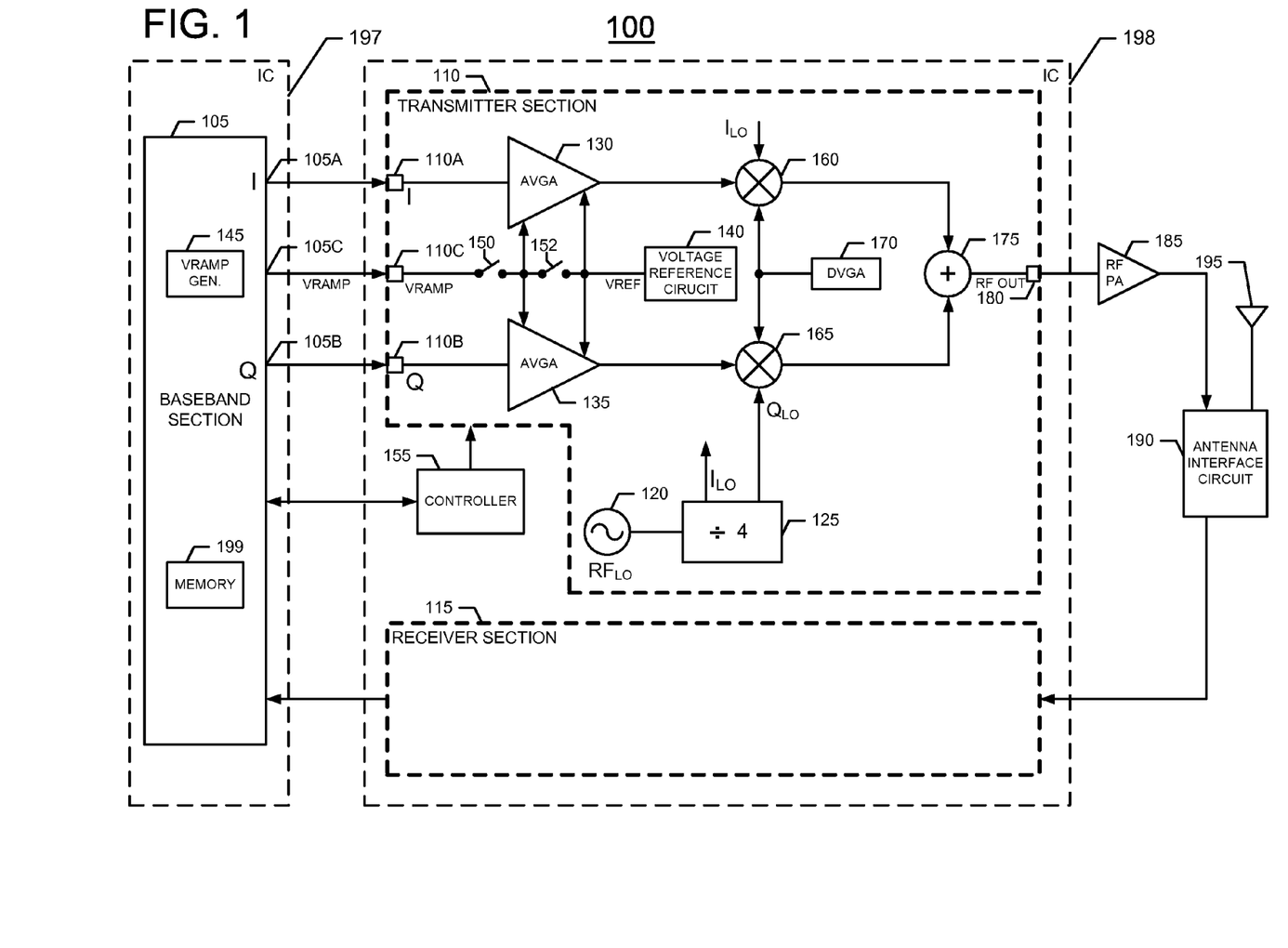
FIG. 1 shows a block diagram of one embodiment of the disclosed wireless communication device.

FIG. 1 shows a block diagram of a wireless communication device 100 that includes a baseband section 105 coupled to a transmitter section 110 and a receiver section 115. A frequency synthesizer formed by RF local oscillator 120 and quadrature divider 125 controls the transmit and receive frequencies of communication device 100. Although not specifically shown, the frequency synthesizer is also coupled to receiver section 115. Quadrature divider 125 includes in phase and quadrature outputs that generate an in-phase local oscillator signal, $I_{LO}$, and a quadrature local oscillator signal, $Q_{LO}$, respectively.

In the transmit path of communication device 100, baseband section 105 generates in-phase (I) and quadrature (Q) baseband signals at baseband outputs 105A and 105B, respectively. Baseband outputs 105A (I) and 105B (Q) couple to the I and Q inputs, 110A and 110B, respectively of transmitter section 110. Transmitter section 110 includes analog variable gain attenuators (AVGAs) 130 and 135 that couple to I and Q inputs 110A and 110B, respectively, as shown. AVGAs 130 and 135 attenuate the I and Q signals in a controlled variable manner as described in more detail below.

A voltage reference circuit 140 couples to AVGAs 130 and 135 to provide a reference voltage, VREF, thereto. A voltage ramp generator 145 in baseband section 105 supplies a voltage ramp signal, VRAMP, to AVGAs 130 and 135 via switch 150 when switch 150 is closed by a controller 155. Controller 155 also controls the opening and closing of switch 152 in the path between voltage reference circuit 140 and AVGAs 130 and 135. The VRAMP signal generated by VRAMP generator 145 controls the amount of attenuation exhibited by AVGAs 130 and 135. At minimum attenuation or maximum gain, AVGAs 130 and 135 exhibit unity gain. In one embodiment, maximum attenuation is a predetermined value such as 30 dB, for example.

AVGAs 130 and 135 couple to I channel mixer 160 and Q channel mixer 165 which together form an up-converting mixer stage. Mixers 160 and 165 are digital variable gain amplifier (DVGA) type mixers which exhibit a gain that is controlled by, and varies with, the particular DVGA word that is stored in DVGA register 170. The $I_{LO}$ and $Q_{LO}$ outputs of quadrature divider 125 couple to I channel mixer 160 and Q channel mixer 165, respectively, to provide local oscillator signals thereto for use in the up-conversion mixing process. In one embodiment, control circuitry 155 controls the DVGA word stored in DVGA register 170 to control the gain of variable gain mixer stage formed by mixers 160 and 165.

The signal outputs of I channel mixer 160 and Q channel mixer 165 couple to respective inputs of an adder 175 that adds the up-converted mixed I and Q channel signals together. In one embodiment, adder 175 is implemented as a wired OR circuit. In this manner, an RF output signal is supplied to RF output 180, namely RF OUT.

RF output 180 couples to an RF power amplifier 185 that in one embodiment is a linear amplifier exhibiting a fixed amount of gain. RF amplifier 185 amplifies the RF signal provided thereto up to a predetermined output signal level determined by the power output calibration technology discussed in more detail below. The output of RF power amplifier 185 couples via an antenna interface circuit 190 to an antenna 195. Antenna interface circuit 190 also couples to the input of receiver section 115. In this manner, transmitter section 110 and receiver section 115 can share the same antenna 195.

Several factors affect the power output of communication device 100. These factors include tolerances on the amplitudes of the I and Q signals supplied by baseband section 105, the attenuation range of AVGAs 130 and 135, the voltage level of the VRAMP signal that sets the attenuation or gain of AVGAs 130 and 135, the gain of mixers 160 and 165 as set by DVGA register 170, and the gain of RF power amplifier 185.

Figure 2:
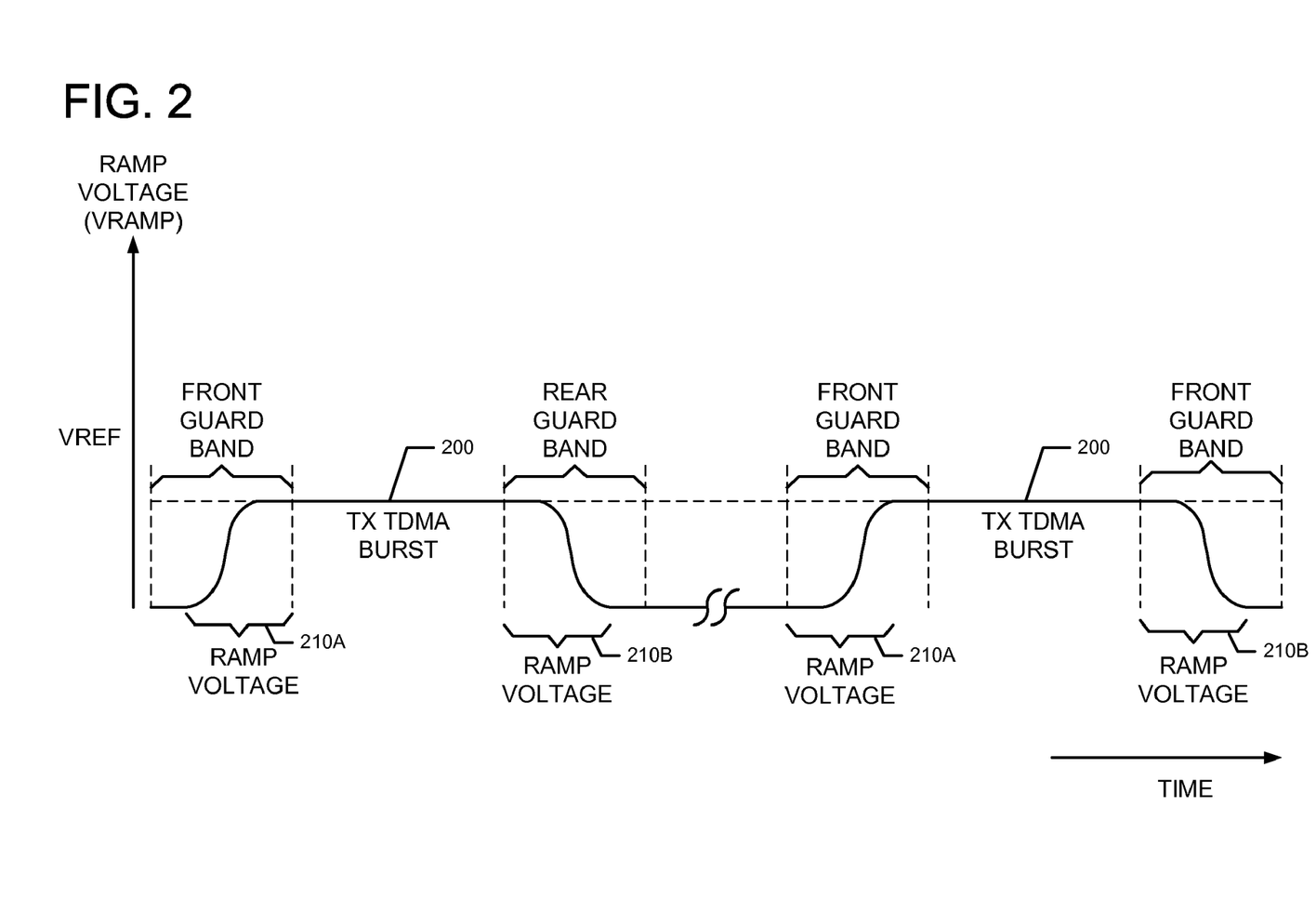
FIG. 2 is as voltage vs. time representation of the ramp voltage signal relative to signal bursts in the transmitted signal.

The ramp signal VRAMP supplied by VRAMP generator 145 in baseband section 105 controls the analog variable gain attenuators (AVGAs) 130 and 135 during the guard band at the beginning of a signal burst, during the burst itself, and during the guard band at the end of a signal burst of a communication signal. For example, FIG. 2 is a voltage vs. time representation that shows the voltage of the ramp signal, VRAMP, supplied by VRAMP generator 145 in baseband section 105 to control the attenuation exhibited by AVGAs 130 and 135. By so controlling the attenuation of the AVGAs 130 and 135, the VRAMP signal controls the power output of transmitter section 110. In one embodiment, a communication signal includes a series of TDMA signal bursts. The beginning and end of each TDMA burst includes respective guard bands, namely front and rear guard bands. Valid signal information is transmitted in the portion of the TDMA burst between the front guard band and the rear guard band. During the front guard band, the ramp signal, VRAMP, at 210A ramps up to a predetermined value over time to avoid generation of undesired RF spectral products. Likewise, during rear guard band, the ramp signal, VRAMP, at 210B ramps down to a predetermined value over time to again avoid the generation of undesired RF spectral products. Thus, the power output of transmitter section 110 varies up and down following the curve shown in FIG. 2. As mentioned above, the ramp voltage VRAMP is one variable that controls the analog output power of transmitter section 110 and ultimately the power output of RF power amplifier 185. For this reason, inaccuracies in the ramp voltage VRAMP as compared to the internal reference voltage VREF can affect output power.

One technique for calibrating the output power of communication device 100 is to set the ramp voltage to its maximum value that would be observed during transmit. This corresponds to a minimum attenuation by AVGAs 130 and 135. Then, the I and Q signals supplied to transmitter section 110 are set to their maximum values and the output power of RF power amplifier 185 is measured in the factory. While observing the RF power output, the value of the DVGA word in DVGA register 170 is adjusted to compensate for any inaccuracies in the signal path until the RF PA 185 is transmitting at the predetermined output power according to a specification.

Unfortunately, when there are inaccuracies in the AVGAs 130 and 135 and in the amplitudes of the I and Q signals, and the ramp signal, while all of these can be compensated in mixers 160 and 165 by the proper DVGA word, such an approach does not optimize the signal path for linearity. Moreover, such a calibration approach may require too much dynamic range in the DVGA controlled mixers 160 and 165.

Ideally the baseband section 105 which provides the I and Q signals, the AVGA stage 130, 135, the ramp signal VRAMP and the VREF signal should be optimized together. Then the up-converter mixer stage 160, 165 should be optimized by itself to provide the best linearity and to minimize dynamic range concerns therein.

One way to calibrate communication device 100 stage by stage is now discussed. To optimize baseband section 105 and AVGA stage 130, 135 it is desirable to have the internal VREF signal at 140 to be as close to being equal to the ramp voltage VRAMP as possible so that the attenuation or gain of AVGAs 130, 135 is as close to unity gain as possible. In communication device 100, when VRAMP is at a maximum value, this corresponds to minimum attenuation by AVGAs 130, 135 and thus unity gain by AVGAs 130, 135. One way to make the internal VREF signal at 140 be equal to the VRAMP signal is to set the VREF signal to a predetermined value and then adjust the VRAMP signal until its voltage equals the voltage VREF. However, adjusting the ramp voltage VRAMP requires an external calibration procedure in the factory when the communication device is manufactured. It is desirable to eliminate as many such factory calibration steps as possible.

Alternatively, the VRAMP voltage can be set at a maximum value and then the communication device itself adjusts the internal VREF voltage until it is equal to the ramp voltage VRAMP. When VRAMP is set to its maximum value VRAMP_FS in an arbitrary range, this corresponds to the AVGA stage 130, 135 exhibiting unity gain or minimum attenuation. In this embodiment, instead of varying the ramp voltage, the internal VREF voltage is variable.

A representative factory process for calibrating a communication device 100 using the disclosed technology is now discussed. In one embodiment, baseband section 105 is fabricated on one integrated circuit (IC) 197, while transmitter section 110, receiver section 115 and controller 155 are fabricated on another integrated circuit (IC) chip 198. In the factory, IC 198 is coupled to RF power amplifier 185 and antenna interface circuit 190 as shown. An antenna 195 or suitable dummy load is coupled to antenna interface circuit 190. Power output will be measured at the output of RF power amplifier 185 or at the output of antenna interface circuit 190.

Next, while the ramp voltage VRAMP is at its maximum value, VRAMP FS (full scale), among a range of values, the ramp voltage VRAMP is disconnected from controlling the attenuation of AVGAs 130, 135 by opening switch 150. In one embodiment, controller 155 opens switch 150 for calibration purposes. Instead of the external ramp voltage VRAMP controlling the attenuation of AVGAs 130, 135, the internally generated voltage VREF controls the attenuation exhibited by AVGAs 130, 135. To accomplish this, controller 155 closes switch 152 to couple VREF voltage reference circuit 140 to the inputs of AVGAs 130, 135 previously connected to receive the VRAMP signal. By closing switch 152 and opening switch 150, the AVGAs 130 and 135 are set to their minimum attenuation. During factory calibration, the DVGA word in DVGA register 170 is varied or adjusted until the output power is correct according to the predetermined output power specification value. In one embodiment, the base band section 105 through controller 155 controls the varying of the DVGA word to find the desired DVGA word that corresponds to the predetermined output power specification value.

The calibration for setting the internal VREF voltage to be equal to the external VRAMP FS voltage is actually performed during initialization of communication device 100. When communication device 100 is turned on, device 100 performs a number of calibrations before commencing normal operation. For example, during initialization, communication device 100 performs an image rejection calibration as described in U.S. patent application, Paulus et al., for a "Method for Performing Dual Mode Image Rejection Calibration in a Receiver, Ser. No. 11/227,797, filed Sep. 15, 2005, that is assigned to the same assignee as the subject patent application, the disclosure of which is incorporated herein by reference in its entirety.

Figure 3:
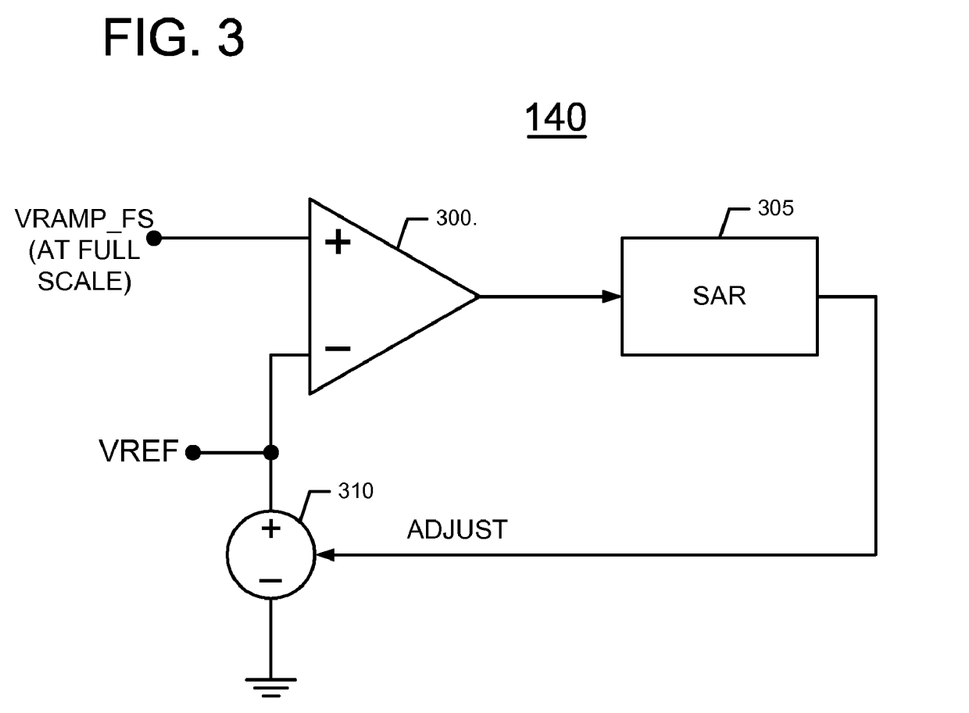
FIG. 3 shows a block diagram of a voltage reference circuit calibration mechanism.

Moreover, during initialization, communication device 100 also performs the disclosed output power calibration to set the internal VREF voltage to be equal to the external ramp voltage. During initialization, VRAMP generator 145 in baseband circuitry 105 is instructed to output its maximum ramp voltage, namely the full scale ramp voltage, VRAMP FS. Voltage reference circuit 140 of communication device 100 includes a calibration mechanism depicted in FIG. 3. The full scale ramp voltage, VRAMP FS, from baseband section 105 is applied to the non-inverting input of a comparator 300. The output of comparator 300 drives an adjustment mechanism 305 such as a successive approximation routine (SAR). The adjustment mechanism 305 supplies an ADJUST signal to a variable voltage source 310 that couples to the inverting input of comparator 300 as shown. The VREF output of variable voltage source 310 is the output of VREF circuit 140. In this particular embodiment, a successive approximation routine is employed as the adjustment mechanism to set the VREF voltage to be equal to the full scale ramp voltage, VRAMP FS. The voltage VREF is then maintained at this set value which corresponds to unity gain in AVGAs 130, 135.

The next step in the factory calibration process is to measure the power output of RF power amplifier 185 and vary the DVGA word stored in DVGA register 170 to set the gain of up-converting mixers 160, 165 such that the power output of RF power amplifier 185 equals the predetermined power value called for in the specification. This particular DVGA digital word is then stored in a non-volatile memory 199 in baseband section 105 for later use when the communication device 100 is powered up for normal use outside the factory. Advantageously in this power calibration process, the baseband section 105 provides transmitter section 110 with a full scale ramp voltage value without the need for more complex interactions between baseband section 105 and transmitter section 105 during calibration.

Figure 4:
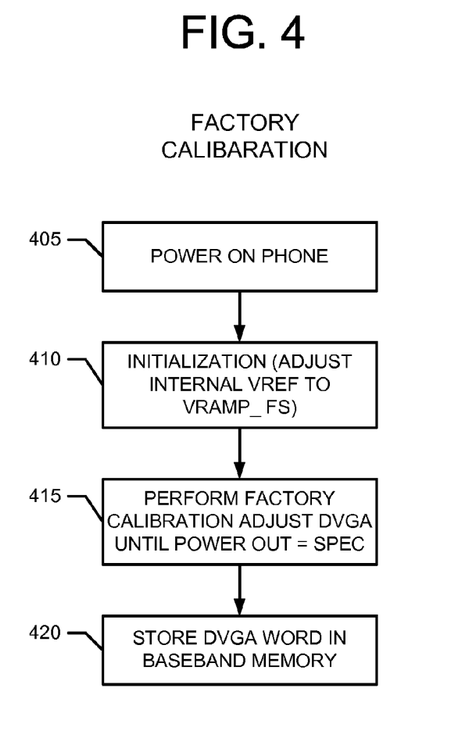
FIG. 4 is a flowchart depicting process flow during factory calibration of the disclosed communication device

FIG. 4 is a flowchart that summarizes the factory calibration process. The communication device or phone is powered on, as per block 405. Communication device 100 is then initialized, as per block 410. During initialization, the ramp signal (VRAMP) is set to its full scale value, VRAMP_FS, and the internal VREF voltage generated by voltage reference circuit 140 is set to be approximately equal to VRAMP_FS using a successive approximation routine. For this block 410, either switch 150 or 152 is open, or both switches 150 and 152 are open. Next, as part of block 415 in the FIG. 4 flowchart, either switch 150 is closed and switch 152 is open, or switch 150 is open and switch 152 is closed. In block 415, the output power of communication device 100 is measured and the DVGA word in DVGA register 170 is varied until the power output equals the power output called for in the specification. Once the DVGA word is found that corresponds to the desired output power, then this DVGA word is stored in memory 199 in baseband section 105, as per block 420. The same DVGA word may be used later by communication device 100 in normal operation by the user.

Figure 5:
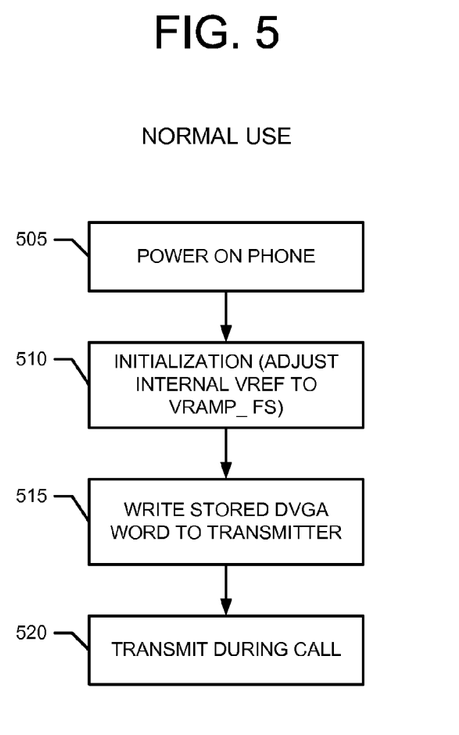
FIG. 5 is a flowchart that depicts the operation of the disclosed wireless communication device in the normal operational mode.

FIG. 5 is a flowchart that summarizes the operation of the communication device in a normal operational mode. The communication device or phone is powered on, as per block 505. Communication device 100 is then initialized, as per block 510. During initialization, the ramp signal (VRAMP) is set to its full scale value, VRAMP_FS, and the internal VREF voltage generated by voltage reference circuit 140 is set to be equal to VRAMP_FS using a successive approximation routine. For this block 510, either switch 150 or 152 is open, or both switches 150 and 152 are open. Then, as per block 515, in one embodiment the DVGA word previously stored in memory 199 during factory calibration is written into DVGA register 170 if the previously calibrated output power level is desired. Alternatively, another word having a value relative to the stored DVGA word may be written into DVGA register 170 so that device 100 will operate at another power level that is offset relative to the previously calibrated power level. For example, using the same DVGA word from the calibration operation will produce the same corresponding calibrated power output as before, whereas another DVGA word may produce an output level 6 dB less or 6 dB more than the calibrated output power level. Device 100 may operate at other offset output power levels as well depending on the particular value of the DVGA word relative to the DVGA word determined in the calibration process. During this block 515, switch 150 is on and switch 152 is off. To summarize, the DVGA word sets the power output of communication device 100 to the same power output level set during factory calibration or to a power level that is offset by a particular value relative to the factory calibrated output power level. Now the user can transmit at the specified power output level during a phone call, as per block 520. During normal operation by the user, as per block 520, switch 150 is on and switch 152 is off.

The methodology described above, wherein VREF is varied and set to be equal to the full scale ramp voltage VRAMP_FS, advantageously avoids multiple power measurements. This is in contrast to an alternative approach that is now described. First, switch 152 is closed and switch 150 is opened to place AVGAs 130 and 135 in a unity gain mode. The DVGA word is then varied until the output power, RF OUT, equals a predetermined desired value within specification. Next, switch 152 is opened and switch 150 is closed. The voltage VRAMP is then applied to transmitter section 110. The output power, RF OUT, is again measured and the value of the VRAMP signal is adjusted until the desired value of RF OUT is reached again. In this manner, the VRAMP signal is adjusted to the VREF value while the AVGAs 130 and 135 exhibit unity gain.

A wireless communication system is thus disclosed wherein in one embodiment each stage is optimized for performance. In one embodiment, during the useful part of the signal burst, the AVGAs are set as close as possible to unity gain to attain maximum linearity in the signal path. Moreover, noise performance is improved in one embodiment. The disclosed power calibration is also desirable as compared to communication devices with polar architectures that can require four or more power calibration measurements. While the above described representative embodiments refer to calibration in terms of voltage, the teachings herein also apply to calibration in terms of current. For example, the VRAMP signal could instead be a current ramp signal instead of a voltage ramp signal. The VREF signal could be a current reference signal instead of a voltage reference signal, and so forth, for the other voltage levels and values employed in the disclosed calibration apparatus and methodology.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of calibrating the gain of a transmitter, comprising:
   providing a ramp signal to a transmitter including first and second stages, the ramp signal exhibiting a predetermined value among a range of values;
   adjusting, by the first stage, a reference signal to exhibit a reference signal value that is approximately equal to the ramp signal predetermined value, the reference signal value and the ramp signal value controlling the gain of the first stage; and
   adjusting, by the second stage, power generated by the transmitter to a predetermined power level.

2. The method of claim 1, wherein the predetermined value of the ramp signal is a maximum value among the range of values.

3. The method of claim 1, wherein the range of values and the reference signal value are voltage values.

4. The method of claim 1, wherein the range of values and the reference signal value are current values.

5. The method of claim 1, wherein the first stage includes a variable gain attenuator.

6. The method of claim 1, wherein the second stage includes a variable gain mixer.

7. The method of claim 6, wherein the adjusting by the second stage step further comprises storing, in a memory, a second stage gain value that is found in the adjusting by the second stage step to correspond to the predetermined power level.

8. The method of claim 7, wherein the second stage gain value is a digital voltage gain amplifier word.

9. The method of claim 1, wherein the adjusting by the first stage step is performed during an initialization of the transmitter.

10. The method of claim 1, wherein the adjusting by the second stage step is performed during a factory calibration.

11. A method of calibrating the gain of a transmitter, comprising:
providing a ramp signal to a transmitter including first and second stages, the ramp signal exhibiting a predetermined value among a range of values;
adjusting, by the first stage, a reference signal to exhibit a reference signal value that is approximately equal to the ramp signal predetermined value, the reference signal value and the ramp signal value controlling the gain of the first stage;
adjusting, by the second stage, the gain of the second stage to determine a second stage gain value for which the transmitter generates output power equal to a predetermined power level;
storing, in a memory, a word related to the second stage gain value; and
retrieving, from the memory, the word for use in subsequent operation of the transmitter to set power output equal to the predetermined power level or a power level offset from the predetermined power level.

12. The method of claim 11, wherein the predetermined value of the ramp signal is a maximum value among the range of values.

13. The method of claim 11, wherein the range of values and the reference signal value are voltage values.

14. The method of claim 11, wherein the range of values and the reference signal value are current values.

15. The method of claim 11, wherein the first stage includes a variable gain attenuator.

16. The method of claim 11, wherein the second stage includes a variable gain mixer.

17. The method of claim 11, wherein the adjusting by the first stage step is performed during an initialization of the transmitter.

18. The method of claim 11, wherein the adjusting by the second stage step is performed during a factory calibration.

19. The method of claim 11, wherein the ramp signal exhibits a maximum voltage value among a range of voltage values that when applied to the first stage causes the first stage to exhibit unity gain.

20. The method of claim 11, wherein the ramp signal exhibits a maximum voltage value among a range of voltage values that when applied to the first stage causes the first stage to exhibit a minimum attenuation value among a range of attenuation values.

21. A wireless communication device comprising:
a baseband section; and
a transmitter section, coupled to the baseband section, the transmitter section including a first stage coupled to a second stage, the baseband section supplying a ramp signal to the first stage, the ramp signal exhibiting a predetermined value among a range of values;
the first stage including a reference signal generator that generates a reference signal that is adjusted to exhibit a reference signal value that is approximately equal to the ramp signal predetermined value, the reference signal value and the ramp signal value controlling the gain of the first stage;
the second stage exhibiting adjustable gain wherein the second stage determines a second stage gain value for which the device generates output power equal to a predetermined power level.

22. The wireless communication device of claim 21, wherein the predetermined value of the ramp signal is a maximum value among the range of values.

23. The wireless communication device of claim 21, wherein the range of values and the reference signal value are voltage values.

24. The wireless communication device of claim 21, wherein the range of values and the reference signal value are current values.

25. The wireless communication device of claim 21, wherein the first stage includes a variable gain attenuator.

26. The wireless communication device of claim 21, wherein the second stage includes a variable gain mixer.

27. The wireless communication device of claim 21, further comprising a memory, coupled to the second stage, that stores a word related to the second stage gain value.

28. The wireless communication device of claim 27, wherein the second stage retrieves the word from the memory for use in subsequent operation of the wireless communication device to set power output equal to the predetermined power level or a power level offset from to the predetermined power level.

29. The wireless communication device of claim 21, further comprising an RF amplifier coupled to the transmitter section to provide an RF output signal.

\* \* \* \* \*

UNITED STATES PATENT AND TRADEMARK OFFICE
CERTIFICATE OF CORRECTION

PATENT NO. : 7,609,781 B2
APPLICATION NO. : 11/427800
DATED : October 27, 2009
INVENTOR(S) : Kerth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Twelfth Day of October, 2010

David J. Kappos
*Director of the United States Patent and Trademark Office*